United States Patent [19]
Goodman et al.

[11] Patent Number: 6,100,875
[45] Date of Patent: Aug. 8, 2000

[54] KEYBOARD POINTING DEVICE

[75] Inventors: Michael Ken Goodman, Tustin; Charles Frederick Raasch, Lake Forest; Farzad Noorbehesht, Aliso Viejo, all of Calif.

[73] Assignee: AST Research, Inc., Irvine, Calif.

[21] Appl. No.: 08/174,215

[22] Filed: Dec. 28, 1993

Related U.S. Application Data

[63] Continuation of application No. 07/939,821, Sep. 3, 1992, abandoned.

[51] Int. Cl.[7] .................................................. G09G 5/08
[52] U.S. Cl. ........................ 345/163; 345/168; 345/159; 345/160
[58] Field of Search .................................. 345/156, 157, 345/160, 159, 163, 168, 145, 141, 130, 133, 169; 341/21, 22, 31; 200/5 A, 6 A; 273/148 B; 463/37

[56] References Cited

U.S. PATENT DOCUMENTS

| | | | |
|---|---|---|---|
| 4,680,577 | 7/1987 | Straayer et al. | 340/711 |
| 4,698,626 | 10/1987 | Sato et al. | 340/710 |
| 4,736,191 | 4/1988 | Matzke et al. | 340/709 |
| 4,739,128 | 4/1988 | Grisham | 340/709 |
| 4,812,833 | 3/1989 | Shimauchi | 345/175 |
| 4,853,630 | 8/1989 | Houston | 340/709 |
| 4,879,556 | 11/1989 | Duimel | 340/709 |
| 4,992,631 | 2/1991 | Gee | 200/6 A |
| 5,027,304 | 6/1991 | Jeng et al. | 364/518 |
| 5,041,819 | 8/1991 | Takeda | 340/711 |
| 5,065,146 | 11/1991 | Garrett | 345/161 |
| 5,119,078 | 6/1992 | Grant | 340/711 |
| 5,124,689 | 6/1992 | Franz et al. | 340/711 |
| 5,262,761 | 11/1993 | Scandura et al. | 345/133 |

OTHER PUBLICATIONS

IBM Technical Disclosure Bulletin, vol. 15, No. 1 (Jun. 1972) <<Keyboard Overlay>> R.G. Gross.
Howard, Bill, "Field Mice: Different, Yes. Better, Maybe" PC Magazine, vol. 10, No. 17, pp. 111–112, 123–126, 133 (Oct. 15, 1991).
"Hot PC Products", Electronic Design, vol. 38, No. 11, p. 22 (Jun. 14, 1990).
Reinhardt, Andrew, "Touch–and–Feel Interfaces", BYTE, pp. 223–226.
Dell System 325NC User's Guide, pp. 2–16, 3–1 through 3–4, 3–15, Dell Computer Corporation (Jan. 1992).
"Windows on the Road", Howard Eglowstein, BYTE, vol. 17, No. 3, pp. 208–213, 216, 218, 220 (Mar. 1992).

Primary Examiner—Lun-Yi Lao
Attorney, Agent, or Firm—Knobbe, Martens, Olson & Bear, LLP

[57] ABSTRACT

An apparatus and method emulates mouse pointer functions utilizing a keyboard having an additional special function key. When the special function key is depressed, designated keys on the keyboard are interpreted as "mouse keys" which may be used to direct a pointer on a computer screen in a manner similar to a conventional mouse pointer. In one embodiment, the keys used as cursor movement keys during normal operation are designated as "mouse keys" which effect the movement of the pointer on the screen when the special function key is depressed. In addition, other keys may be used as left and right mouse buttons and as mouse lock keys. In one embodiment, the pointer speed is gradually increased when the user continuously holds any of the cursor movement keys down for a preselected interval. The data generated by the "mouse keys" are indistinguishable from data provided by conventional mouse pointer devices so that a conventional mouse driver and standard command protocol may be used in accordance with the present invention.

11 Claims, 8 Drawing Sheets

KEYBOARD POINTING DEVICE

This application is a continuation of application Ser. No. 07/939,821, filed Sep. 3, 1992, now abandoned.

BACKGROUND OF THE INVENTION

1. Field of the Invention

The present invention relates to the field of microprocessor-based computer systems, and relates more particularly to modification of the operation of a keyboard to perform operations normally associated with a mouse pointing device

2. Description of the Related Art

Over the past several years, a number of peripheral devices which perform specialized operations have been designed and implemented in order to enhance the operation of microprocessor-based computer systems. Such peripheral devices may, for example, facilitate user interaction with the system. One example of such a peripheral device is the "mouse" pointer. This device allows a user to quickly and easily point to any location on a computer terminal display screen. The mouse pointers are particularly useful in computers which employ "window" displays, pull-down menus and/or icons. This is because the mouse can be used to point to a given window or icon and to activate the function designated by the display window or icon. Hence, mouse pointers have become especially popular over the past several years, and have gained wide acceptance within the computer industry.

A conventional mouse pointer comprises an external, hand-operable device which detects motion in reference to a flat surface. For example, a conventional mouse device may include a partially encapsulated rubber ball which is exposed on one surface, and is in continuous contact with cylindrical rollers inside the mouse. When the exposed surface of the ball is placed in contact with a flat surface and is moved across this surface, the ball rotates, and the frictional force between the rubber ball and the rollers inside the mouse causes the rollers to move. The movement of these rollers may subsequently be detected and converted into electrical signals corresponding to the vertical and horizontal motion of the mouse pointer. The signals thus generated are converted into digital information which is used to determine the speed and direction of the pointer on the screen. Typically, conventional mouse devices also include one or more buttons which may be used to select an option or activate a given function.

Although conventional mouse devices have proven very useful under normal circumstances, the use of such devices may be impaired under conditions where no flat surface is available, or when a significant amount of vibration or movement is present. Such conditions often prevail during air or automobile travel, and generally in many circumstances where one uses a lap-top or notebook computer.

Due to the aforementioned problems, it is desirable to provide a device which allows a user to perform mouse-like operations without the necessity of a flat, steady surface. Furthermore, it is desirable that such a device be implemented so that it may function in accordance with existing computer systems.

SUMMARY OF THE INVENTION

The present invention provides a new and useful method and apparatus for overcoming the aforesaid disadvantages associated with conventional mouse pointer devices. In the apparatus of the present invention, normal keyboard operations are modified by means of a special function key or "hot key" so that mouse-like operations may be performed via the computer keyboard. In a preferred embodiment, a keyboard includes a keyboard controller as well as an additional function key. This additional function key serves to indicate to the keyboard controller that certain keys are to be interpreted to emulate mouse-like operations.

One aspect of the present invention involves a mouse pointer emulating apparatus for controlling the position of a mouse cursor on a host computer display screen. The mouse emulating apparatus further provides additional mouse functions in a host computer by interpreting selected keys on a keyboard to output data similar to that provided by a peripheral mouse pointer coupled to a conventional mouseport on a computer operable with a conventional mouse pointer. The mouse emulating apparatus further provides incremented speed variation which increases the speed, up to a maximum speed, of the mouse pointer on the display screen by predetermined increments as selected ones of the selected keys remains active. The mouse emulating apparatus comprises a keyboard controller coupled to the selected keys and to the host computer. One of the selected keys comprises a special function key. The keyboard controller is responsive to the special function key to interpret signals from other ones of the selected keys into mouse data packets. The keyboard controller transmits the mouse data packets to the host at preselected report intervals.

In one embodiment, the keyboard controller further comprises a mouse speed timer, and the keyboard controller is responsive to the mouse speed timer to increase the speed of mouse pointer movement by a preselected increment at preselected intervals while the other ones of the selected keys remain active. In one embodiment, the preselected intervals are 400 milliseconds. In one embodiment, the speed of the mouse increases from a first level to a second level, and to a third maximum level.

Another aspect of the present invention involves a mouse pointer emulating apparatus for controlling the position of a mouse cursor on a computer display screen for a computer, operable with a conventional mouse pointer. The mouse emulating apparatus comprises, in general a keyboard having a plurality of keys which activate key switches when depressed, a keyboard controller coupled to the key switches, and a special function key coupled to the keyboard controller. The keyboard controller is configured to scan the switches to determine which of the plurality of keys are active. An active signal from the special function key, indicates to the keyboard controller that activation of selected ones of the plurality of keys indicate a function other than the function provided by the selected ones of the keys when the special function key is not active. When the special function key is active, the keyboard controller responds to signals from the selected one of the plurality of keys to generate data indicating movement of a mouse pointer on the computer display. The keyboard controller further transmits the mouse data to the host at a preselected frequency.

In one embodiment, the mouse emulating apparatus also provides additional mouse control functions other than movement, such as left and right button functions of a conventional mouse pointer device.

One aspect of the present invention also involves a method of emulating a conventional mouseport mouse pointing device with a keyboard. The method comprises a plurality of steps. A keyboard having a plurality of keys is scanned. One of the keys is a special function key, and selected other of the plurality of the keys are preselected to indicate mouse pointing device operations when the special function key is active. If the special function key is active, the method proceeds to determine if any of the selected other keys are active. If the special function key is active and at least one of the selected other keys is active, the activation of the at least one of the selected other keys and the duration of activation are interpreted into mouse data. The mouse data is substantially equivalent to conventional mouse data. Finally, the mouse data is sent to a mouse driver of a host computer to effect mouse functions in the host computer.

DETAILED DESCRIPTION OF THE INVENTION

Figures 1A, 1B:
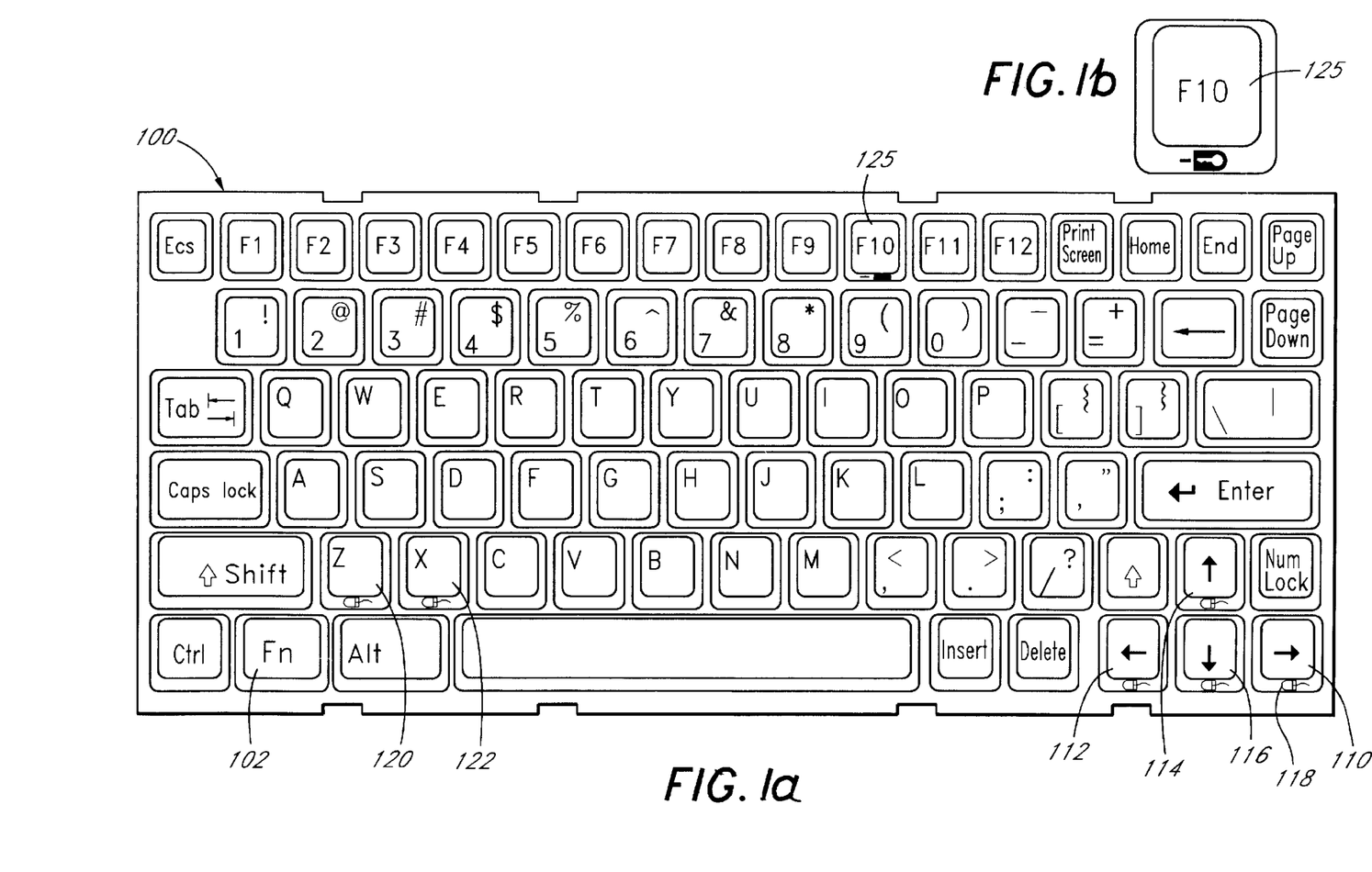
FIGS. 1a and 1b are a plan view of a modified keyboard which may be used in accordance with the present invention.

FIG. 1a is a plan view of a modified keyboard 100 which may be used in accordance with the present invention. In one embodiment, the keyboard 100 is implemented within a notebook computer, although it should be understood that the present invention is not restricted to notebook computers. The keyboard 100 has been modified to include an additional special function key 102, which is designated on the keyboard by an "Fn." The keyboard 100 also includes additional symbols on the front sloping face of certain keys. These additional symbols indicate the additional functions which may be performed upon activation of these keys while the special function (Fn) key 102 is depressed.

Selected keys on the keyboard 100 are interpreted in accordance with the present invention to emulate mouse operations when the Fn key 102 is active. In the embodiment shown in FIG. 1a, the right and left cursor movement keys 110, 112, as well as the up and down cursor movement keys 114, 116 are used to position a pointer on a computer screen in a manner similar to that accomplished by a conventional mouse pointer. The keys 110–116 are designated with a mouse symbol 118 on their front sloping faces to aid the user. During conventional use, the cursor movement keys 110–116 cause the cursor to move vertically or horizontally across the computer screen, as is well understood in the art. However, the cursor movements are typically restricted to simple horizontal movement (i.e., horizontal movement with no simultaneous component of vertical movement) across lines of text in single character increments or simple vertical movement from one line of text to another. Thus, the cursor typically does not move diagonally, and it does not typically move in increments smaller than one line or character. Although the operation of the cursor movement keys 110–116 is generally sufficient for word processing and for many other applications, the restricted movement of the cursor is not desirable in certain applications (e.g., pull-down menu, graphical and icon-based applications) where a mouse pointer is generally preferred.

In accordance with the present invention, the operation of the cursor movement keys 110–116 are interpreted when the Fn key 102 is active to emulate a PS/2 compatible mouse pointing device. The apparatus and method by which these modifications are accomplished will be described in detail with reference to FIGS. 2–5d below. In one embodiment, the operation of the cursor movement keys 110–116 is interpreted to enable positioning of the cursor at any point on the computer screen, and to enable diagonal, vertical and horizontal movement. A cursor of this kind is typically called a pointer, and may be represented on the computer screen, for example, by an arrow, a cross or the like.

The operation of the cursor movement keys 110–116 may be further interpreted to provide adjustable pointer speeds so that the speed of the pointer as it moves across the screen is gradually increased in increments while the cursor keys 110–116 remain active. These modifications in the operation of the cursor movement keys 110–116 serve to provide a system wherein the movement of the pointer, as controlled by the cursor movement keys 110–116, emulates the movements obtained via a conventional mouse pointer. Thus, the method and apparatus of the present invention provide mouse data (i.e., data which is typically transmitted from a conventional mouse pointer device) to a host computer operating system.

The present invention also provides for additional mouse functions to be implemented via the keyboard 100. For example, in one embodiment of the present invention the operation of the "z" and "x" keys 120, 122 may be interpreted to emulate the left and right buttons on a two-button mouse. Of course, it should be noted that the keyboard may similarly be modified to emulate the operations of a one- or three-button mouse as well.

One embodiment of the present invention also incorporates an additional mouse-lock feature. The mouse-lock causes the designated mouse keys (i.e., keys 110–116 and 120–122 in the embodiment shown in FIG. 1) to lock into mouse emulation operations so that it is not necessary to hold down the function (Fn) key 102 while using these designated mouse keys to perform mouse functions. In the embodiment shown in FIG. 1, the function key 125, labeled F10, may be used as a mouse-lock key when depressed simultaneously with the special function (Fn) key 102. Simultaneously depressing the special function (Fn) key 102 and the F10 function key 125 a second time turns off the mouse-lock function. FIG. 1b is an enlarged view of the F10 key 125 which illustrates the screening of an icon representing the mouse-lock function on a front face of the F10 key 125, which indicates to the user that the F10 key 125 can be used in combination with the Fn key 102 to activate a mouse lock function. Thus, selected keys on the keyboard 100, in combination with control circuitry described below, when used in accordance with the present invention, emulate mouse pointer operations.

In order to initiate modification of the operation of the cursor movement keys 110–116, the z and x keys 120, 122 and the F10 key 125 to perform mouse-like operations, the user simply depresses the special function (Fn) key 102 and also depresses one or more of the keys 110–116, 120, 122, 125, designated as mouse keys, while holding down the Fn key 102. For example, if the user is holding down the function (Fn) key 102, while simultaneously depressing the left cursor key 112 and the up cursor key 114, the pointer on the screen will move at an angle of approximately 45° across the screen. In order to increase the speed of the pointer in one embodiment, the user merely holds the appropriate keys down for a predetermined period. The system of the present invention automatically increases the pointer speed by preset increments over a pre-selected time interval (e.g., in the present embodiment, an increase in pointer speed occurs on a preselected 400 millisecond interval up to a maximum predefined speed).

Figure 2:
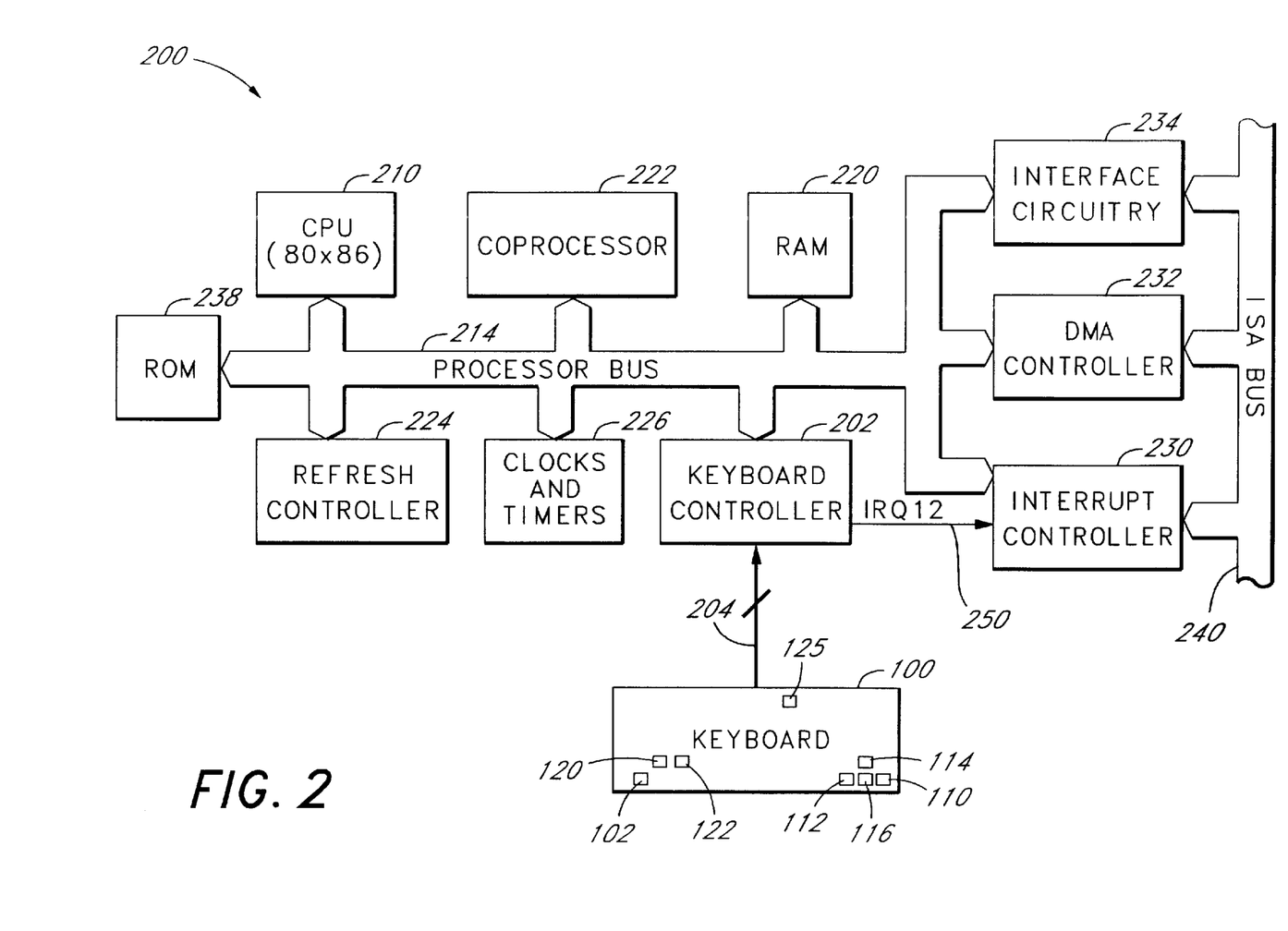
FIG. 2 is a block diagram which shows the basic functional elements of the keyboard and host computer used in accordance with the present invention.

FIG. 2 is a block diagram which depicts the main functional elements of a microprocessor based computer system 200. The system 200 includes the modified keyboard 100, with the special function (Fn) key 102. The keyboard 100 in FIG. 2 is also depicted with the keys 110, 112, 114, 116, 120, 122, 125 selected for use in emulating a mouse pointer device. The keyboard 100 is connected to a keyboard controller 202 via signal lines 204. The keyboard controller 202 is typically internal to the keyboard 100, but is depicted as a separate block for illustration. The keyboard controller 202 is connected to the host system via a processor bus 214. The host system may include a number of processing devices such as a CPU (an Intel® 80286, 80386, 80486, or the like, designated as 80x86 in FIG. 2) 210, a RAM 220, a co-processor 222, a refresh controller 224, clocks and timers 226, an interrupt controller 230, a DMA controller 232, interface circuitry 234, and a ROM 238. All of these processing devices are in communication with the keyboard controller via the processor bus 214. In one embodiment, the interrupt controller 230, the DMA controller 232, and the interface circuitry 234 are additionally connected to an Industry Standard Architecture (ISA) bus 240. In addition to being connected to the interrupt controller 230 by means of the processor bus 214, the keyboard controller 202 is connected to the interrupt controller 230 by means of an IRQ 12 signal line 250.

The keyboard controller 202 is activated whenever a key on the keyboard 100 is depressed. Once a key is depressed, the keyboard controller 202 scans the keyboard 100 to determine which one or more keys were activated. The keyboard controller 202 evaluates each key in order to determine if data (e.g., a conventional scan code) identifying the key should be transmitted to the operating system computer, or if the keystrokes should be interpreted further. For example, if the key is not the Fn key 102, the keyboard controller 202 transmits data (e.g., a conventional scan code) to the CPU 210 which indicates to the host which key was pressed. However, if the active key is the special function (Fn) key 102, then the keyboard controller 202 does not transmit scan code data to the CPU 210. Instead, the keyboard controller 202 interprets the subsequent keystrokes and outputs modified data to the CPU 210. Thus, if the first key pushed is the special function (Fn) key 102, the keyboard controller 202 does not inform the host computer operating system (i.e., send a scan code to the CPU 210) that this key has been pressed. The keyboard controller 202 waits for the keystrokes which follow while the special function (Fn) key 102 remains active, and executes a predefined function assigned to the keys before sending data to the operating system.

Accordingly, in the present invention the keyboard controller 202 interprets any keys activated during activation of the special function (Fn) key 102. If the keystrokes following activation of the Fn key 102 are from the designated "mouse keys" (i.e., keys 110–116, 120, 122, or 125), then the keyboard controller 202 does not transmit the data (e.g., conventional scan code) which would normally be sent to the operating system to identify these keys, but transmits data which emulates the data which the operating system would normally receive from a mouse pointing device. The emulated mouse data forwarded by the keyboard controller is indistinguishable by the operating system from data which is normally generated from a conventional mouse pointer. Accordingly, the operating system receives the data as though it were from a conventional mouse pointer connected to the mouseport. A more detailed description of the procedure employed by the keyboard controller 202 to provide emulated mouse data to the host is discussed with reference to the flowcharts of FIGS. 4–5d below.

Figure 3:
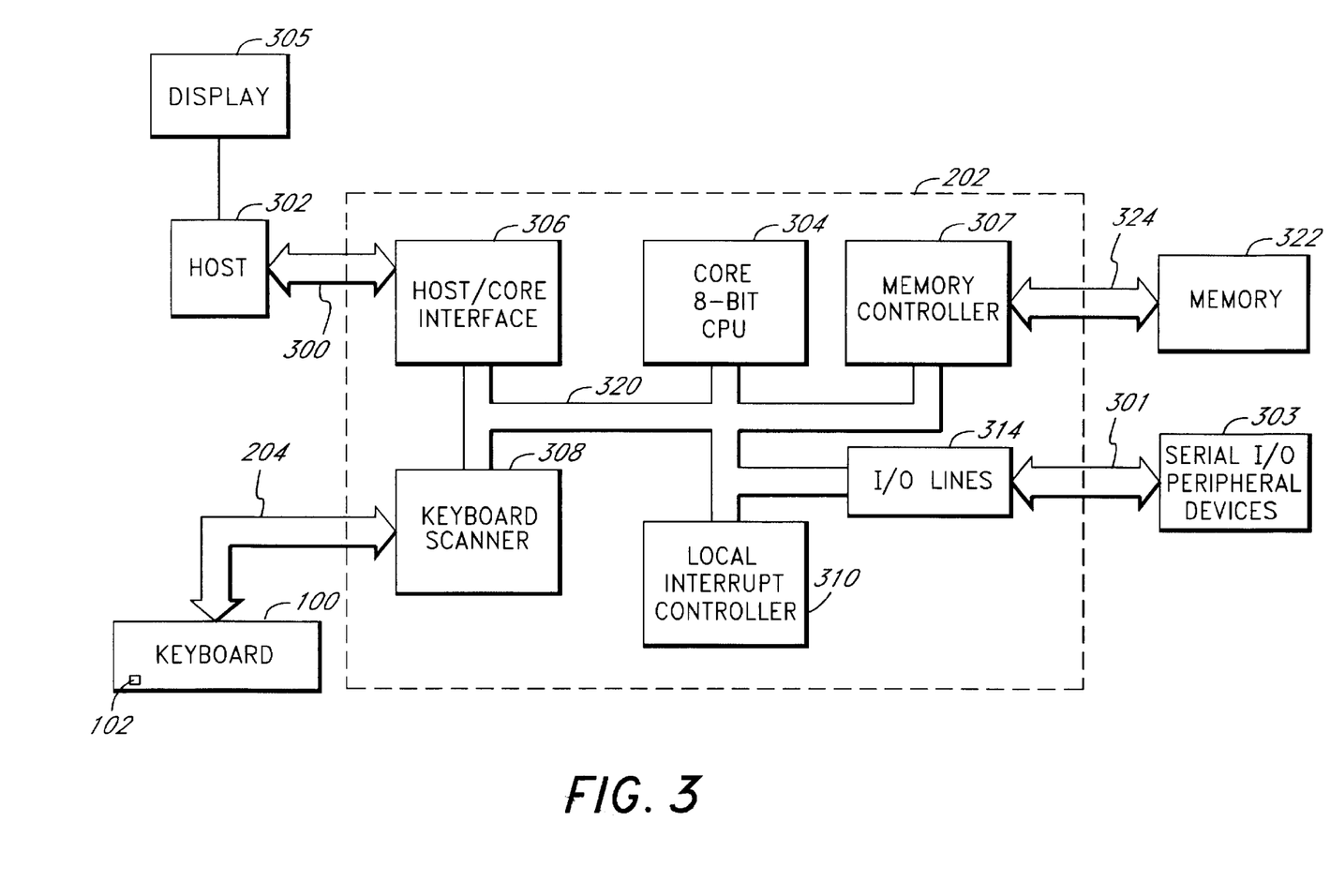
FIG. 3 is a block diagram which details the major functional elements of the keyboard controller.

FIG. 3 is a block diagram which details the major functional elements of one embodiment of the keyboard controller 202. The keyboard controller 202 has a core 8-bit CPU 304, a host/core interface 306, a memory controller 307, a keyboard scanner 308, a local interrupt controller 310, and input/output lines 314. These elements are interconnected by means of an internal bus 320. The Intel 80C51SL AG keyboard controller or AST Research, Inc.'s MIKI keyboard controller are examples of appropriate keyboard controllers used in computer systems which utilize the keyboard controller as an interface between a mouse and the operating system.

The keyboard controller 202 is connected via an input/output bus 300 to the host computer (designated generally here as 302). The host computer generally comprises the CPU (80x86) 210, ROM 238, the refresh controller 224, the clocks and timers 226, and a display 305, the DMA controller 232, the interrupt controller 230 and the interface circuitry 234, as is well understood in the art. The input/output bus 300 includes the input and output connections to ports 60 hex and 64 hex (i.e., the conventional input and output ports) of the keyboard controller 202, as well as the interrupt connection line 250, which is connected to the interrupt request terminal 12 (IRQ 12) of the interrupt controller 230. The keyboard controller 202 is also connected to the keyboard 100 via signal lines 204, and to one or more serial input/output peripheral devices 303 via signal lines 301.

The memory controller 307 is further connected to a memory 322 via signal lines 324. Although the memory 322 is shown in FIG. 3 as being external to the keyboard controller 202, it should be understood that the memory 322 may also be internal to the keyboard controller 202. The keyboard controller 202 executes instructions stored in the memory 322.

Figure 4:
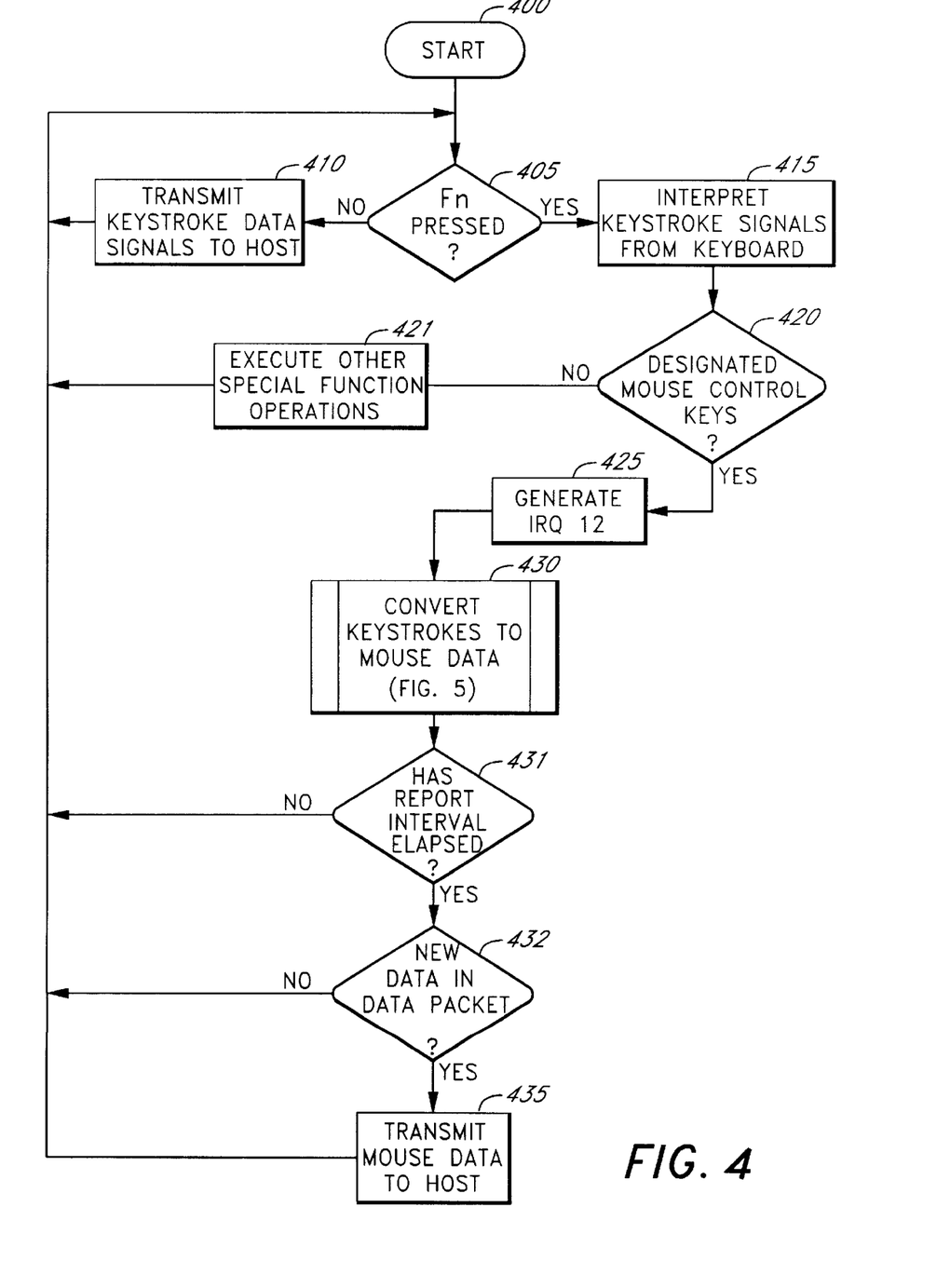
FIG. 4 is a flowchart which shows the general procedure used to convert the signals associated with certain keys into signals identical to those normally output by a mouse pointer device.

The general method used by the keyboard controller 202 to emulate mouse operations is described with reference to the flowchart of FIG. 4. Instructions controlling execution by the keyboard controller 202 to carry out the tasks of FIGS. 4–5d are stored in the memory 322 for the keyboard controller. The flowchart begins in a start block 400. In one embodiment, the operations which follow the start block 400 are only executed after the keyboard controller detects that at least one key on the keyboard has been depressed.

Control of operations of the present invention begins at a decision block 405, wherein a determination is made if the special function (Fn) key 102 is currently depressed. If the function (Fn) key 102 is not depressed, the keyboard controller 202 transmits the keystroke data corresponding to the key (or keys) which is (are) active to the operating system of the host 302, as represented in a process block 410. If the function (Fn) key 102 is depressed, the keyboard controller 202 interprets the subsequent keystroke signals generated by the keyboard 100 while the function (Fn) key 102 is depressed, as represented in a process block 415. The keyboard controller then determines if these subsequent keystroke signals are signals from the designated mouse control keys, as represented in a decision block 420. The keyboard controller 202 makes this determination by examining the active keys via the keyboard scanner 308 and determining if any active keys include the designated mouse keys 110–116, 120, 122, 125 (FIG. 3). If the signals are not from the designated mouse control keys, then control passes to a process block 421, wherein other keys predefined to perform special functions are processed by the keyboard controller 202.

If the keystroke signals are from the designated mouse keys 110–116, 120, 122, 125, then control passes from the decision block 420 to a process block 425. At the process block 425, the keyboard controller 202 generates an interrupt request signal (IRQ 12) and transmits the IRQ 12 to the host 302 via the signal line 250 (FIG. 2). This indicates to the host computer that the data from the keyboard controller 302 which follows will be mouse data. As is well known in the art, the host will then execute a routine (a mouse driver) activated by the IRQ 12 interrupt signal to process the incoming mouse data. Control then passes from the process block 425 to a subroutine block 430, wherein the signals from the designated mouse control keys 110–116, 120, 122, 125 are processed and converted into mouse data. This is advantageously accomplished by means of the core CPU 304. In other words, the core CPU 304 executes instructions in the memory 322 to process the data received from the keys and generate mouse data.

The method employed within the subroutine block 430 is described in greater detail with reference to the flowchart of FIGS. 5a–5d below. Once the appropriate mouse data has been generated at the subroutine block 430, and an appropriate report (i.e., sample) period has elapsed, as represented in a decision block 431, the mouse data is transmitted to the host 302, as represented in an action block 435. If the appropriate report period has not elapsed, however, control returns to the start of the method. Since mouse data is transmitted in packets, as is well understood in the art, the action block 432 represents a decision whether any new data is available in the packet. For instance, has the state of a mouse key changed or has the mouse moved since the last data was sent to the host. If no change has occurred in the packet awaiting transmission to the host 302, then the packet need not be transmitted.

Because the interpretation of the designated mouse keys when the Fn key 102 is active is controlled by the keyboard controller 202, the creation of mouse data is effectively transparent to the operating system of the host 302. In other words, the operating system of the host 302 receives no indication that the designated mouse keys on the keyboard were depressed, but simply receives data indicating mouse movement and control as if the data originated from a mouse connected to the mouseport.

In order to receive and process the mouse data correctly, the host computer 302 is advantageously equipped with mouse driver software. Because in the present embodiment the keyboard mouse operation emulates a conventional PS/2-compatible mouse connected to a conventional mouseport, the mouse driver software of the host which processes the mouse data provided by the keyboard controller 202 is a conventional PS/2 mouse driver, and is well known in the art. For example, appropriate mouse drivers which may be used in accordance with the present invention can be obtained from Microsoft.

The mouse driver is typically a terminate and stay resident (TSR) program which is installed for execution by the host computer 302 when the host 302 receives the IRQ 12. After installation, TSR programs remain within the memory of the host 302. Thus, these programs are transparent during normal operation of the host computer 302. A TSR program may be activated by means of an interrupt signal generated by an appropriate source (e.g., the keyboard controller 202). The mouse driver program is activated when an interrupt signal is generated by the keyboard controller 202 and applied to the IRQ 12 input terminal of the interrupt controller 230. The interrupt controller 230 instructs the CPU 210 of host computer 302 to address the memory location where the mouse driver program is located in memory. The mouse driver program then processes the mouse data from the keyboard controller 202 as if the data were from a conventional mouse pointing device.

It should be noted that, although the flowchart of FIG. 4 is described as though it represents a continually executing process, the process is advantageously interrupt driven. That is, once any key is pressed, an interrupt is generated to signal the local interrupt controller 310 for the keyboard controller 202. The local interrupt controller 310 then activates the process outlined in the flowchart of FIG. 4.

Figure 5A:
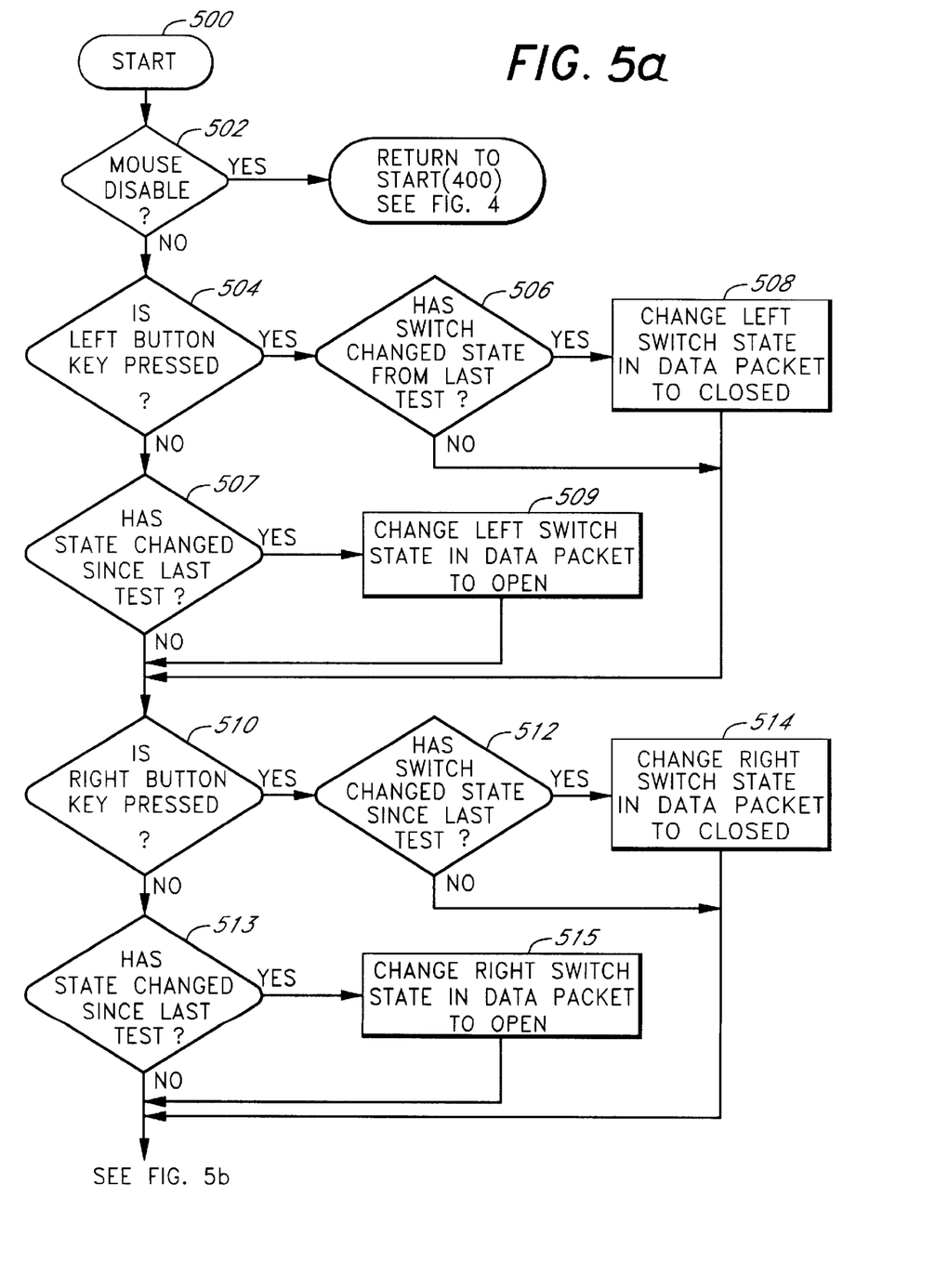
FIG. 5 is a more detailed flowchart which illustrates the method used to convert keystrokes to mouse data.
Figure 5B:
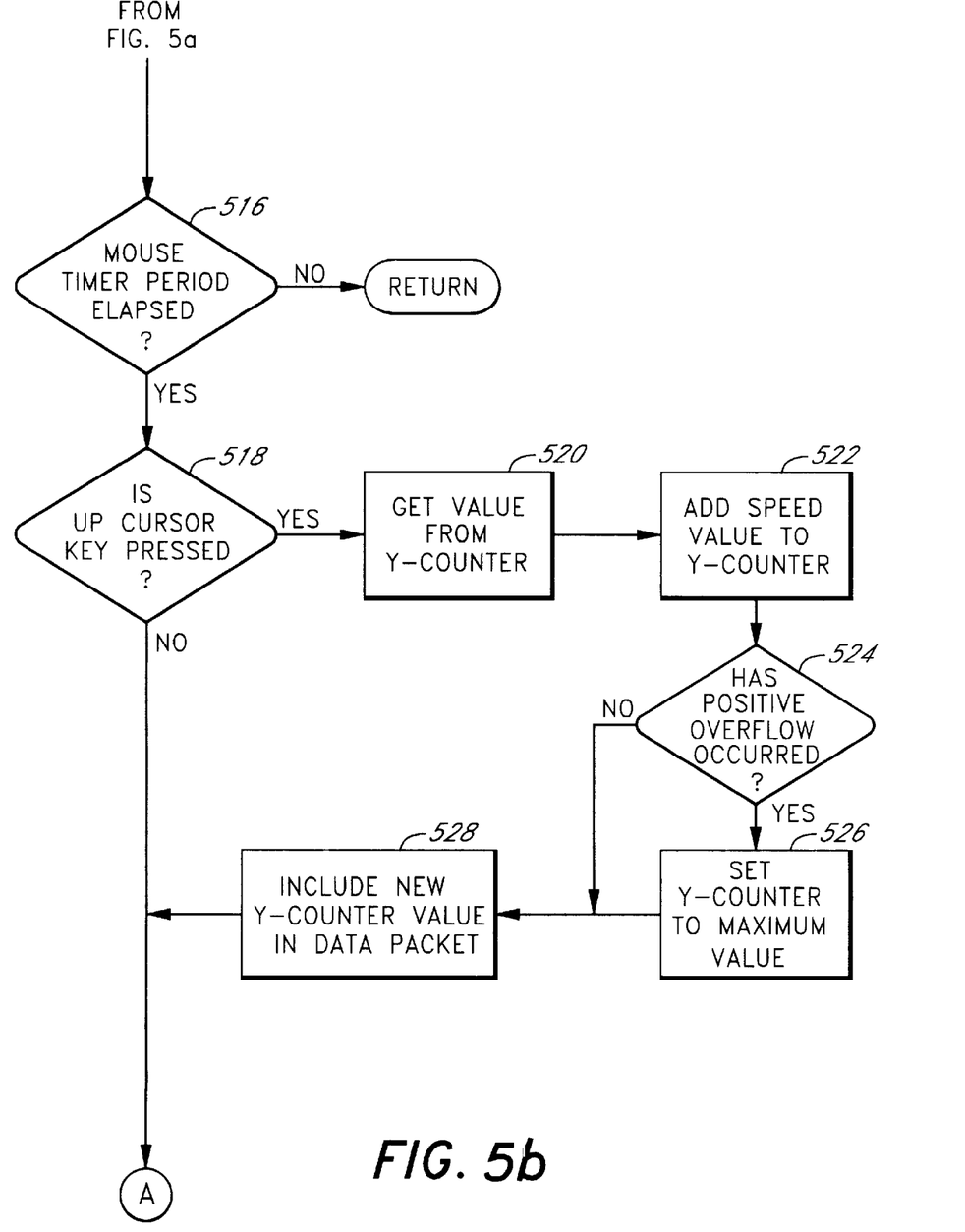
Figure 5C:
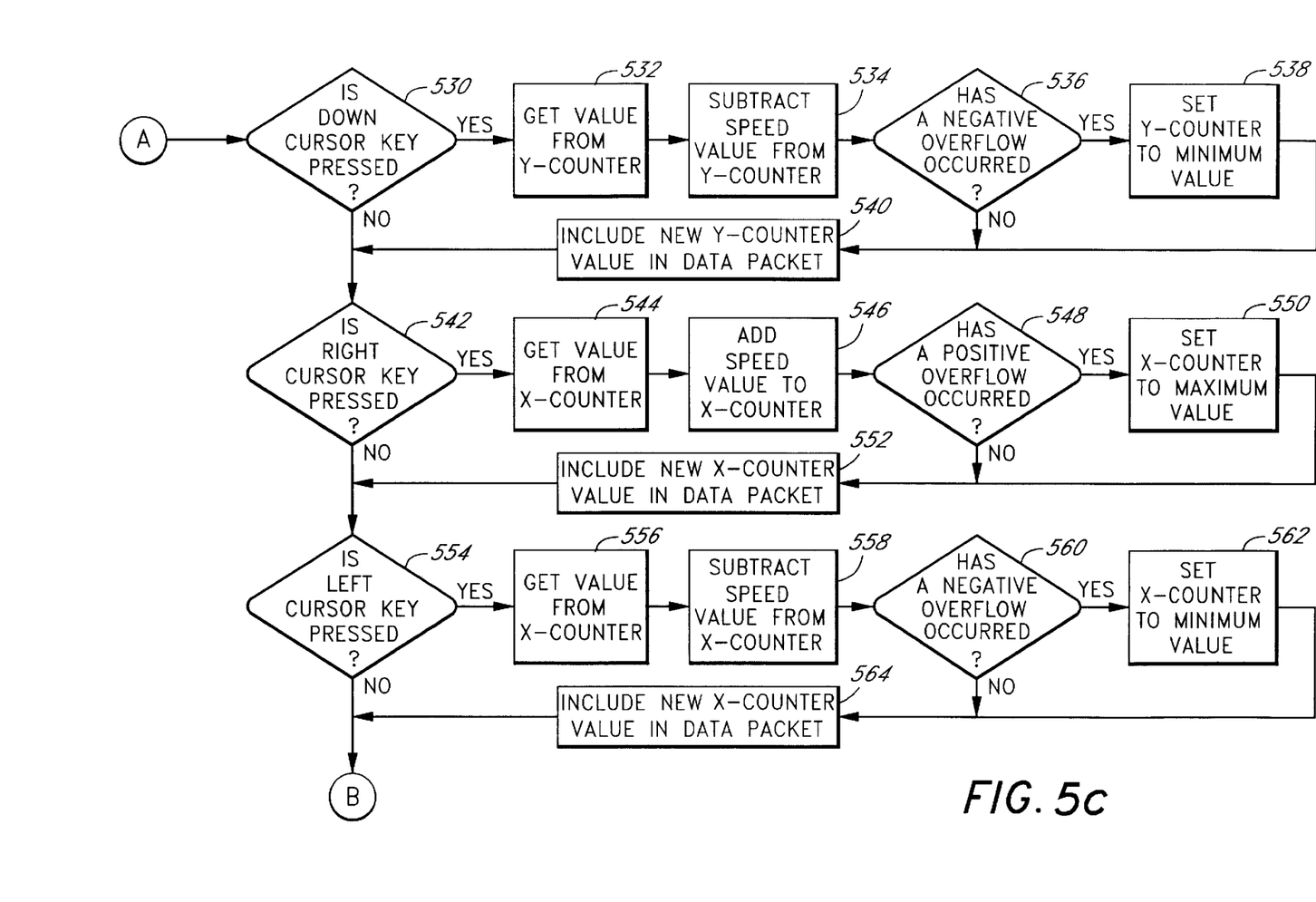
Figure 5D:
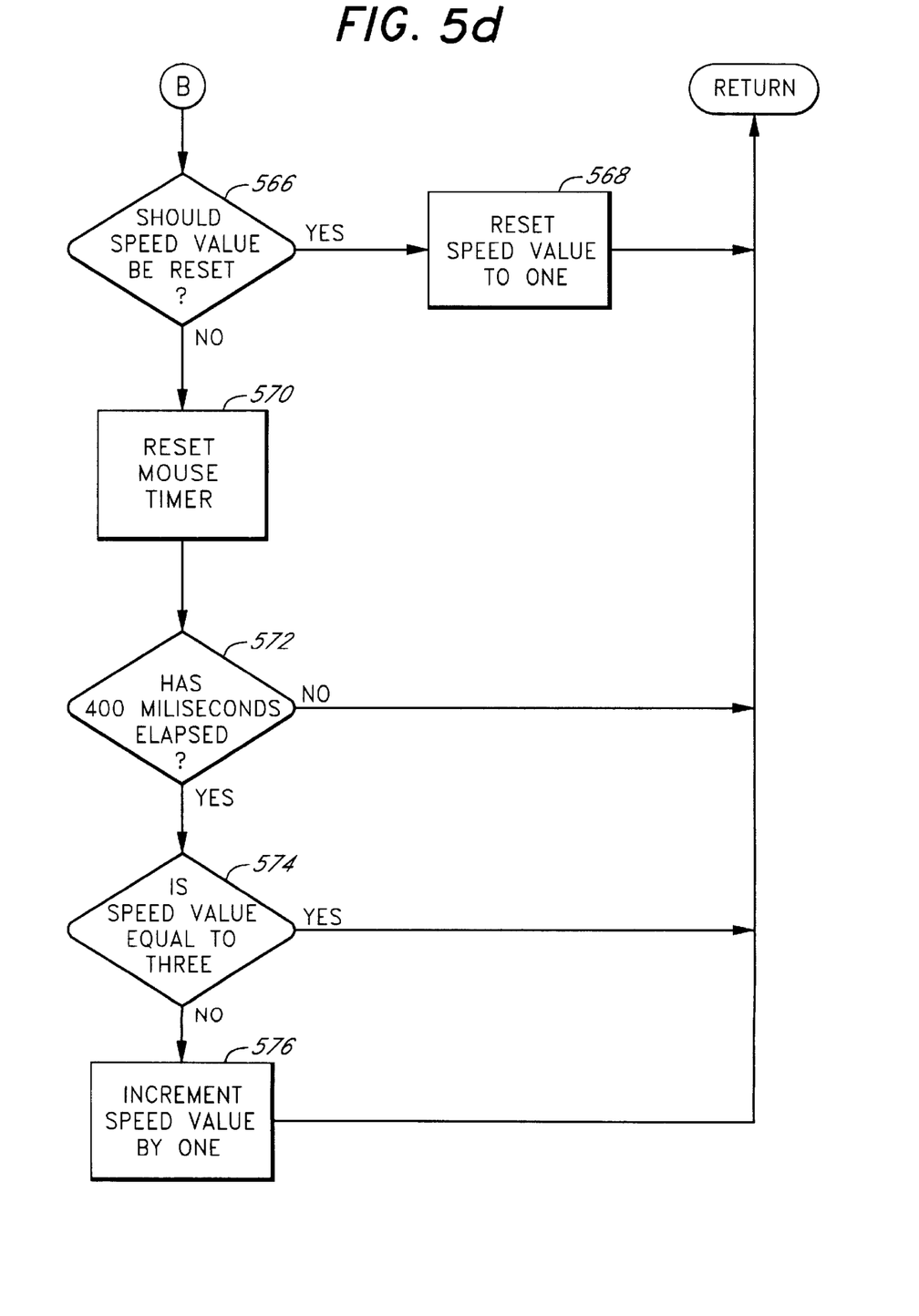

The flowchart of FIGS. 5a–5d details the process represented by the subroutine block 430 (i.e., the process of generating mouse data for the host 302). As illustrated in FIG. 5a, the routine begins at a start block 500. Initially, the keyboard controller 202 determines whether the mouse is disabled as represented in a decision block 502.

In conventional systems, the operating system (of the host) performs two tests to determine if a mouse is connected to the system. The first test determines whether or not a mouse is attached to the mouseport. If a mouse is connected to the mouseport, the mouseport takes precedence, and a serial mouse is normally ignored. If no mouse is connected to the mouseport, the operating system performs a second test to determine whether a serial port mouse is being used. Due to sequence of operation of the host 302, the use of a serial port mouse in combination with the keyboard emulated mouse of the present invention would normally result in the serial port mouse being ignored. This is because the present invention emulates a mouse connected to the mouseport, and the system would always ignore a serial port mouse because the keyboard mouse would always indicate the presence of a mouseport mouse.

However, if a serial port mouse is connected, presumably, the user may desire to use the serial port mouse rather than the keyboard mouse. In order to solve this difficulty, the present invention provides an option list for the user during set-up operations of the computer. The list of selections during set-up is as follows:

none
serial port 1
serial port 2
mouseport

The user selects, during set-up of the computer system 302, which type of mouse is desired. If the user selects a serial port mouse at set-up, then this sets a keyboard mouse disable bit. The test performed by the keyboard controller 202 in decision block 502 determines whether this disable bit has been set. If the disable bit has been set, then the keyboard mouse emulator is disabled and control returns to the beginning of the keyboard routine (e.g., the start block 400 of FIG. 4). If the keyboard mouse emulator is not disabled, then the keyboard controller 202 proceeds to interpret designated mouse keys active during activation of the Fn key 102. The data provided by the keyboard controller 202 are stored in conventional mouse data packets.

In one embodiment, each data packet comprises three bytes of binary data and has several fields. For example, some fields of the data packet contain data indicating the state (inactive or active) of the left button key or right button key, fields contain a number of X and/or Y counts (i.e., increments of directional movement in the X and/or Y directions, as utilized by the mouse driver to move the pointer on the screen) and fields contain data indicating whether an overflow has occurred in the X counts or Y counts.

A new data packet is sent to the host 302 periodically at time intervals (the report interval) determined by a value contained in a programmable register (the Report Interval register) within the keyboard controller 202. The value within this register effectively regulates the sample rate of the system 200 (i.e., the rate at which the host receives mouse data packets). In one embodiment, the sample rate ranges from 10 data-packets per second to 200 data-packets per second, and the register values assigned in the present embodiment correspond to sample rates as shown in the table below:

| Report Timer Register Value | Sampling Rate |
| --- | --- |
| 20 | 10 data-packets/sec |
| 10 | 20 data-packets/sec |
| 5 | 40 data-packets/sec |
| 4 | 60 data-packets/sec |
| 3 | 80 data-packets/sec |
| 2 | 100 data-packets/sec |
| 1 | 200 data-packets/sec |

In the present embodiment, the Report Interval register value indicates the number of times the keyboard controller 202 passes through the control program illustrated in FIG. 4 before a packet is transmitted to the host. Thus, the rate at which data packets are sent to the host 302 may be changed by simply changing the Report Interval register value.

In some applications it is advantageous to automatically regulate the sample rate in response to the needs of the system 200. For instance, if the majority of the data packets ready to be transmitted to the host 302 over a given time interval contain very little mouse data, then a high sampling rate wastes computer time by sending data packets with very little or no data. Conversely, if many data packets to be sent over a given time interval contain the maximum data possible in the packets, then a low sampling rate may result in lost data. Thus, in accordance with one embodiment of the present invention, the sampling rate is regulated periodically in response to the number of data overflows for packets transmitted to the host within a given time interval.

If the keyboard mouse is not disabled (decision block 502), interpretation of the mouse keys begins in the decision block 504 of FIG. 5*a*. At the decision block 504, a test is performed to determine if the key assigned to act as the left button of a two-button mouse (i.e., the left button key 120 (FIG. 1)) is pressed. If the left button key 120 is pressed, then control passes to a decision block 506.

Typically, one bit in each data packet represents the state of the left button. In the present embodiment, the state of this bit stays the same for consecutive packets in accordance with the last change of this bit. Therefore, at the decision block 506, the keyboard controller 202 performs a test to determine if the left button key 120 has changed state since the last test. If the left button key 120 has not changed state since the last test, then this indicates that the user was holding the left button key 120 down during the last pass through this procedure, and the bit in the data packet reflecting the state of the left button key 120 need not be changed in the next packet sent to the host 302. Thus, control passes to a decision block 510. However, if the left button key 120 has changed state since the last test, this indicates that the user has just activated the left button key 120 and the bit in the next data packet which reflects the state of the left button should be set. When the packet is sent to the host 302, the mouse driver interprets the bit to determine that the left button of the mouse was just depressed. Thus, control passes to a process block 508, and data indicating that the left mouse button switch state has changed to closed is placed into a data packet (i.e., the left button state bit is set in the present embodiment). Additionally, the keyboard controller 202 sets a "packet changed" flag (not part of the mouse data packet) which indicates to the keyboard controller 202 that the data packet has changed. Thereafter, control passes to the decision block 510.

If, the left button key 120 is not pressed (not currently active (decision block 504)), the keyboard controller 202 again determines if the state of the key has changed since the last test. As explained above, this is because the next data packet to the host will represent the previous state of the left button. Therefore, if a change has occurred, the appropriate bit should be altered. Accordingly, the keyboard controller 202 determines if the state has changed since the last test, as represented in a decision block 507. If the state has not changed since the last test (i.e., the left button was inactive during the last test), then the keyboard controller 202 proceeds to determine if the right button key is pressed, as represented in an action block 510. If the state of the left button key 120 has changed since the last test (the decision block 507), this indicates that the left button key was active during the last test. Therefore, the keyboard controller 202 changes the left switch state bit in the data packet to reflect the new inactive state, as represented in action block 509 (i.e., the keyboard controller clears the bit in the data packet, which represents the state of the left button of a mouse), and sets the packet changed flag.

Once any information indicating that the left button key 120 has changed state is included within the data packet, the keyboard controller 202 determines if the right button key 122 (i.e., the key assigned to represent the right button on a mouse) is currently active, as represented in the decision block 510. If the right button key 122 is active, then control passes to a decision block 512, and a determination is made whether the state of the right button key 122 has changed since the last test. If the right button key 122 has not changed state since the last test, then this indicates that the user was holding the right button key 122 down during the last execution of the subroutine, and a bit in the packet representing the state of the right mouse button already represents the current state. Thus, control passes to a decision block 516 (FIG. 5*b*). However, if the right button key 122 has changed state since the last test, this indicates that the user has just activated the right button key 122, and the bit in the data packet, which represents the state of the right button key 122 should be set. This will indicate to the host (via the mouse driver) that the right button of the mouse was just activated. Therefore, control passes to a process block 514, and the keyboard controller 202 sets the bit in the current data packet indicating that the state of the right button has changed to closed (i.e., a bit is set in the data packet currently being constructed for transmission to the host 302). In addition, the keyboard controller 202 sets the packet changed flag. Thereafter, control passes to the decision block 516 (FIG. 5*b*).

As explained above, the keyboard controller 202 of the present invention interprets the designated mouse keys to emulate the operation of a mouse connected to the mouseport. Accordingly, when the keyboard controller 202 determines that the right button key 122 has been activated, the data which is stored in the data packet currently being constructed for transmission to the host 302 is the same data which would be generated if a mouse were actually connected to the mouseport.

If the keyboard controller 202 determines that the right button key 122 is not active (the decision block 510), the keyboard controller 202 then determines if the state of the right button key 122 has changed since the last test, as represented in an action block 513. If the state has not changed since the last test, then the bit which represents the state of the right button of a mouse in the next packet to be sent to the host 302 already represents the open or inactive state of the right mouse button, and control passes directly to the decision block 516 (FIG. 5b). If the state has changed since the last test (the decision block 513), this indicates that the user released the right button key 122 since the last execution of the subroutine. Accordingly, the keyboard controller changes the state of the bit in the data packet which represents the right button of the mouse to open or inactive (i.e., it clears the corresponding bit), as represented in an action block 515, and sets the packet changed flag. Thereafter, control passes to the decision block 516 (FIG. 5b).

Once the keyboard controller 202 has processed the left button key 120 and the right button key 122, it proceeds to process the emulated movement of the mouse via the cursor keys 110–116. Blocks 516–564 (FIGS. 5b and 5c) illustrate the operation of the mouse pointer movement keys (i.e., the cursor keys 110–116). The procedure for converting the data obtained from these keys into mouse data is generally the same for each key, so that the same method is repeated for the up, down, right and left cursor keys.

Before the cursor keys are checked, the keyboard controller 202 checks a Mouse Timer value, as represented in a decision block 516. The Mouse Timer value indicates the frequency at which the X-counter and Y-counter values are incremented or decremented with the speed value. In the present embodiment, the Mouse Timer value acts as a test value or delay time before the keyboard controller 202 proceeds through the mouse key conversion routine and again adds or subtracts the speed value to the X-counter or Y-counter, as may be the case. In one embodiment, the Mouse Timer value may be set to 12.5, 25, 50 or 100 increments/decrements of the Y-counter and X-counter per second. In other words, the Mouse Timer value determines a Mouse Timer period. The Mouse Timer period is amount of the time assigned for each pass through the routine which converts the mouse keys to mouse data. The X-counter and Y-counter are incremented/decremented when appropriate during each Mouse Timer period. The increments/decrements per second (Mouse Timer) value is advantageously set during set-up operations. However, it should be noted that the procedure employed in accordance with the present invention could allow a user to update the Mouse Timer value at any time during the operation of the mouse emulation system 200. The Mouse Timer value performs a function similar to resolution in a conventional mouse.

If the Mouse Timer has not elapsed, control returns to the beginning of the routine. If the Mouse Timer has elapsed, the keyboard controller 202 checks the cursor keys, beginning with a decision block 518.

In the present embodiment, the keyboard controller 202 first determines if the up cursor key 114 is currently depressed (active), as represented in the action block 518. If the up cursor key 114 is not active, then the keyboard controller 202 begins processing the down cursor, beginning at a decision block 530 (FIG. 5c), through a continuation point A. However, if the up cursor key 114 is active (as determined at the decision block 518), then control passes from the decision block 518 to a process block 520, and the keyboard controller 202 retrieves a current value of a Y-counter. The Y-counter value is related to the vertical distance that the pointer is to be moved on the computer screen. The Y-counter value (as well as an X-counter value, explained below) maintains a running count total of the movement of the mouse since the last packet was sent to the host. These counters are cleared each time a packet is sent to the host, and begin incrementing and/or decrementing with mouse movement (active mouse keys) until the next packet is sent to the host.

Once the Y-counter value has been retrieved in the process block 520, control passes to a process block 522, and a current "speed" value is added to the value within the Y-counter and replaces the original Y-counter value. The "speed" value may assume a value of one, two or three in the present embodiment, and is used to adjust the rate at which the pointer moves across the screen. Since the value of the Y-counter is directly proportional to the distance the pointer moves up or down the computer screen, and the Y-counter is incremented or decremented by the speed value every time through the subroutine loop while the up or down cursor keys are active, the rate at which the pointer moves across the screen is proportional to the speed value. For example, if the speed value is set to one, then each time through the loop while the up cursor key 114 remains active, the keyboard controller increments the Y-counter value by a value of one until the speed value is changed. If the speed value is set to three, then the Y-counter value will be incremented by three each time through the loop while the up cursor key 114 remains active. Thus, the Y-counter value increases three times as fast when the speed value is set to three as when the speed value is set to one. Once the speed value has been added to the Y-counter value of the process block 522, control passes to a decision block 524.

At the decision block 524, a determination is made whether a positive overflow has occurred in the Y-counter. If a positive overflow in the Y-counter has not occurred, control passes to a process block 528. However, if a positive overflow has occurred in the Y-counter, this indicates that the Y-counter value has exceeded its maximum value (e.g., 127 in the present embodiment). Control therefore passes to a process block 526, and the Y-counter is set to its maximum value. A Y-overflow flag (e.g., a single bit) is also set in the current mouse data packet, indicating a Y-counter overflow has occurred.

Either directly from the decision block 524, or after the process block 526, control passes to the process block 528, and the keyboard controller 202 replaces the previous Y-counter value in the current data packet with the new Y-counter value. The keyboard controller 202 also sets the packet-changed flag.

It is possible for the Y-counter value to be incremented and/or decremented several times before its value is transmitted to the host 302 in a data packet. Therefore, it is advantageous to transmit data packets at a rate concordant with the incrementing rate of the Y-counter. For example, if a data packet is sent so infrequently that the Y-counter overflows and is reset to its maximum value several times before the data packet is sent, then the speed of the pointer on the computer screen will not accurately reflect the rate at which the Y-counter is being incremented. Hence, there will be little or no difference if the speed value is set to one, two, or three. Thus, it is advantageous if the rate at which the data packets are sent is correlated relative to the speed value.

The likelihood that the Y-counter value will exceed its maximum value therefore depends upon the report interval (i.e., the sample rate at which packets are sent to the host computer 302) and the speed value. If the Y-counter value exceeds its maximum value on numerous occasions in a given time interval, this indicates that the sample rate is probably too slow. In one embodiment, the keyboard controller 202 monitors the number of times the Y-counter value exceeds its maximum value (i.e., the number of overflows) during a given interval, and increases the sample rate by a predetermined increment until the Y-counter value does not exceed its maximum (e.g., overflow) during the predetermined interval.

Once the new Y-counter data has replaced the previous Y-counter value in the data packet (action block 528), control passes to the decision block 530 (FIG. 5c) through the continuation point A. At the decision block 530, the keyboard controller 202 determines if the down cursor key 116 is currently active. If the down cursor key 116 is not active, then the keyboard controller 202 begins processing the right cursor key, beginning with a decision block 542. However, if the down cursor key 116 is active, then control passes from the decision block 530 to a process block 532, and the keyboard controller 202 retrieves the current value of the Y-counter. Once the Y-counter value has been retrieved, control passes to a process block 534, and the keyboard controller 202 subtracts the current speed value (adds a twos complement value, as is well understood in the art) from the Y-counter value, and replaces the original Y-counter value. When the speed value has been subtracted from the Y-counter value (the process block 534), control passes to a decision block 536. At the decision block 536, the keyboard controller 202 determines if an overflow in the Y-counter has occurred in the negative direction. If a negative overflow in the Y-counter has not occurred, control passes to a process block 540. However, if the Y-counter has overflowed in the negative direction, this indicates that the Y-counter value has exceeded its minimum value (maximum negative) (e.g., the Y-counter has gone below −128 in the present embodiment). Control therefore passes to a process block 538, the Y-counter is set to its minimum value, and the Y-overflow flag is set in the current data packet, indicating the overflow in the Y-counter. Control then passes to the process block 540, wherein the new Y-counter value replaces the previous Y-counter value in the current data packet. The packet-changed flag is also set, indicating to the keyboard controller 202 that the mouse data packet has changed.

Once the new Y-counter data has replaced the previous Y-counter value in the data packet, control passes to the decision block 542. At the decision block 542, the keyboard controller 202 determines if the right cursor key 110 is active. If the right cursor key 110 is not active, then the keyboard controller 202 begins processing the left cursor key 112, beginning at a decision block 554. However, if the right cursor key 110 is active (decision block 542), then control passes from the decision block 542 to a process block 544, and the keyboard controller 202 retrieves the current value of an X-counter. The X-counter value is the horizontal equivalent of the Y-counter value, and serves a similar function (i.e., to indicate the distance that the pointer is moved on the screen in the horizontal direction). Once the X-counter value has been retrieved, the keyboard controller 202 adds the current speed value to the value within the X-counter, to replace the current X-counter value, as represented in a process block 546. When the speed value has been added to the X-counter value, control passes to a decision block 548.

At the decision block 548, the keyboard controller 202 determines if the X-counter has overflowed in the positive direction. If a positive overflow has not occurred in the X-counter, control passes to a process block 552. However, if the X-counter has overflowed in the positive direction, this indicates that the X-counter value has exceeded its maximum value (e.g., exceeded 127 in the present embodiment). Control therefore passes to a process block 550, and the keyboard controller 202 sets the X-counter to its maximum value and sets an X-overflow flag (e.g., a single bit) in the current data packet. The keyboard controller 202 then replaces the previous X-counter value with the new X-counter value in the current mouse data packet and sets the packet-changed flag.

Once the new X-counter value has replaced the previous X-counter value in the mouse data packet, the keyboard controller 202 determines if the left cursor key 112 is currently active, as represented in the decision block 554. If the left cursor key 112 is active, then control passes to a decision block 566 (FIG. 5d) through a continuation point B. However, if the left cursor key 112 is active, then control passes from the decision block 554 to a process block 556, and the keyboard controller 202 retrieves the current value of the X-counter. Once the X-counter value has been retrieved (process block 556), the keyboard controller 202 subtracts the current speed value from (i.e., adds the corresponding twos-complement to) the value within the X-counter, and replaces the original X-counter value, as represented in a process block 558. When the speed value has been subtracted from the X-counter, control passes to a decision block 560. At the decision block 560, the keyboard controller 202 determines if the X-counter has overflowed in the negative direction. If the X-counter has not overflowed in the negative direction, control passes to a process block 564. However, if the X-counter has overflowed in the negative direction, this indicates that the X-counter value exceeded its minimum (i.e., maximum negative) value (e.g., −128 in the present embodiment). Control therefore passes to a process block 562, and the keyboard controller 202 sets the X-counter to its minimum value and also sets an X-overflow flag in the current mouse data packet. The keyboard controller 202 then replaces the previous X-counter value in the current mouse data packet with the new X-counter value. as represented in the process block 564. Additionally, the keyboard controller 202 sets the changed-packet flag.

The changed-packet flag is set anytime data changes in the mouse data packet. This is for use by the keyboard controller 202 to determine if there is any new data in a packet which needs to be sent to the host 302 at the proper report interval.

Once the keyboard controller 202 has passed through the processing of each of the cursor buttons, control passes to the decision block 566 (FIG. 5d) via the continuation point B. At the decision block 566, the keyboard controller 202 determines if the speed value should be reset to a value of one. The speed value is reset to a value of one each time the user releases all of the cursor keys 110–116. This assures that the next time the user presses a cursor key, the speed of the pointer will start at a moderate speed and gradually accelerate to the maximum speed if the cursor key is held down for the preselected interval. If the speed value is to be reset, the keyboard controller 202 sets the speed value to one, as represented in a process block 568. From the process block 568, control returns to the subroutine of FIG. 4 at the decision block 431.

If at the decision block 566, the keyboard controller determines that the speed value should not be reset, then control passes from the decision block 566 to an action block 570, and the keyboard controller 202 resets the Mouse Timer value. In the present embodiment, the Mouse Timer value is reset to correspond to the resolution of the mouse as follows:

| Mouse Timer (counts/second) | Mouse Resolution (counts/mm) |
| --- | --- |
| 12.5 counts/second | 1 counts/mm |
| 25 counts/second | 2 counts/mm |
| 50 counts/second | 4 counts/mm |
| 100 counts/second | 8 counts/mm |

For example, with the mouse resolution set to 1 count/mm, the Mouse Timer is set to a value such that the keyboard controller will check the up, down, right and left cursor keys 12.5 times every second (1 time every 8 milliseconds).

Once the Mouse Timer period has been reset at the action block 570, control passes to a decision block 572, and the keyboard controller 202 determines if the user has been holding one or more of the cursor keys 110–116 down for at least 400 milliseconds since the first activation of the key or since the last increment in the speed value. If 400 milliseconds have not elapsed, then control returns to the decision block 431 (FIG. 4). If 400 milliseconds have elapsed, then control passes to a decision block 574. At the decision block 574, the keyboard controller 202 determines if the speed value is already equal to its maximum value (e.g., three in the present embodiment). If the speed value is not equal to its maximum value, then control passes to a process block 576, and the speed value is incremented by one in the present embodiment. If, however, the speed value is already at its maximum, then the increment is ignored and the speed value remains at the maximum value. Control returns from either the decision block 574 or the process block 576 to the decision block 431 (FIG. 4).

At the decision block 431 (FIG. 4), the keyboard controller 202 determines if the report interval (e.g., the sample interval) has expired. In other words, the keyboard controller 202 determines if it is time to forward a data packet to the host 302. If the report interval has not elapsed, as determined at the decision block 431, control returns to the beginning of the routine, and the keyboard controller 202 again processes the mouse keys, as explained above. If the sample interval has elapsed, the keyboard controller 202 determines if the current mouse packet has changed, as represented in a decision block 432, by checking the changed-packet flag. If the data packet has not changed since the transmission of the last data packet, then control returns to the beginning of the subroutine and the packet is not sent. If the report interval has elapsed (decision block 431) and the data packet has changed since the last transmission (decision block 432), then the keyboard controller 202 transmits the mouse data packet to the host via the output port of the keyboard controller 202. The transmission of the mouse data packet proceeds following conventional protocols as if the data packet were from a conventional mouse connected to the mouse port, as is well understood in the art. The transmission of data to the host is represented in an action block 435.

It should be noted that whenever two or more cursor keys are depressed at the same time, the keyboard controller 202 will detect this in its key detection routine, and data representing the activity of the active keys will be stored in the packet. Accordingly, if a horizontal cursor key and a vertical cursor key are both simultaneously depressed and remain active for the same period of time, the pointer will effectively move in a 45° direction across the screen. If a vertical key and a horizontal key are simultaneously pressed for a portion of a sample interval, and for the remainder of the sample interval only a vertical or horizontal key remains active, the number of X counts and Y counts transmitted to the host will be uneven, and the angle of movement across the computer screen will be other than 45°.

It should further be noted that the data packets as described in FIGS. 5a–5d above, are substantially the same in format to data packets which are generated by mouse pointer devices connected to the mouseport. Furthermore, the mouse commands used in accordance with the present invention follow standard mouse protocol which is well known in the art.

The present invention may be embodied in other specific forms without departing from its spirit or essential characteristics. For example, additional keys may be designated to function with the Fn key 102 in order to increase the range of directions that the pointer may be moved on the screen. Furthermore, the invention may be modified to emulate a one-button or three-button mouse. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mouse pointer emulating apparatus for controlling the position of a mouse pointer on a host computer display screen, said mouse pointer emulating apparatus further providing additional mouse functions in a host computer, said mouse pointer emulating apparatus interpreting selected keys on a keyboard to output data similar to that provided by a peripheral mouse pointer coupled to a conventional mouseport on a computer operable with a conventional mouse pointer, said mouse emulating apparatus further providing incremented speed variation which increases the speed, up to a maximum speed, of the mouse pointer on the display screen by predetermined increments as selected ones of the selected keys remain active, said mouse pointer emulating apparatus comprising:

a keyboard controller coupled to the selected keys and to said host computer, one of the selected keys comprising a special function key, said keyboard controller responsive to the special function key, when active, to interpret signals from other ones of said selected keys and to generate mouse data packets, said mouse data packets generated by said keyboard controller including X-coordinate and Y-coordinate values which represent a change in position of said mouse pointer on said display screen, wherein said signals provided by said selected keys to said keyboard controller when said special function key is active are identical to signals provided to said keyboard controller by said selected keys when said special function key is not active, said keyboard controller further transmitting said mouse data packets to said host computer at preselected report intervals to effect pixel-by-pixel movement of said mouse pointer on said display screen when said special function key is active, said keyboard controller transmitting conventional scan code data in response to activation of said selected keys when said special function key is not active.

2. The mouse pointer emulating apparatus of claim 1, wherein said keyboard controller further comprises a mouse speed timer, said keyboard controller responsive to said mouse speed timer to increase the speed of mouse pointer movement by a preselected increment at preselected intervals while said other ones of said selected keys remain active.

3. The mouse pointer emulating apparatus of claim 2, wherein the preselected intervals are 400 milliseconds.

4. A mouse pointer emulating apparatus for controlling the position of a mouse pointer on a computer display screen for a computer, operable with a conventional mouse pointer, said mouse emulating apparatus comprising:

a keyboard having a plurality of unmodified keys which activate key switches when depressed, said keyboard operating in first and second modes;

a keyboard controller coupled to said key switches, said controller configured to scan said key switches to determine which of said plurality of keys are active and to generate scan code data responsive to keyswitch signals generated by active keys; and a special function key coupled to said keyboard controller, said keyboard controller responsive to said special function key such that when said special function key is active, said keyboard is in said first mode wherein said keyboard controller responds to said keyswitch signals resulting from activation of selected ones of said plurality of keys to transmit mouse data indicating movement of a mouse pointer on the computer display instead of said scan code data, said mouse data packets generated by said keyboard controller including X-coordinate and Y-coordinate values which represent a change in position of said mouse pointer on said display screen to effect pixel-by-pixel movement of said mouse pointer on said display screen, said keyboard controller further transmitting said mouse data to said computer at a preselected frequency, and when said special function key is not active said keyboard is in said second mode wherein said keyboard transmits conventional scan code data in response to said keyswitch signals resulting from activation of selected ones of said plurality of keys.

5. The mouse pointer device emulating apparatus of claim 4, wherein said keyboard controller further comprises a mouse speed timer, said keyboard controller responsive to said mouse speed timer to increase the speed of movement of the mouse cursor on the computer screen by preselected increments at preselected intervals while the selected ones of said keys remain active simultaneously with the special function key.

6. The mouse pointer emulating apparatus of claim 5, wherein the preselected intervals are 400 milliseconds.

7. The mouse pointer emulating apparatus of claim 6, wherein the preselected increment is 1, and wherein the speed of the mouse increases from a first level to a second level, and to a third maximum level.

8. The mouse pointer emulating apparatus of claim 4, wherein the device further provides additional mouse control functions other than movement in a host computer.

9. The mouse pointer emulating apparatus of claim 8, wherein the additional functions are emulation of left and right button functions of a conventional mouse pointer device.

10. A method of emulating a conventional mouseport mouse pointing device with a keyboard, said method for use with a host computer having a display screen which displays a mouse pointer, comprising the steps of:

scanning a keyboard having a plurality of unmodified keys, one of said keys being a special function key, selected others of said plurality of said keys preselected to indicate mouse pointing device operations when said special function key is active;

determining if said special function key is active;

if said special function key is active, determining if any of said selected other keys are active;

if said special function key is active and at least one of said selected other keys is active, interpreting the activation of said at least one of said selected other keys and the duration of activation into mouse data, said mouse data substantially equivalent to conventional mouse data so as to include X-coordinate and Y-coordinate values which represent a change of position of said mouse pointer on said display screen; and sending the mouse data to a mouse driver of a host computer to effect pixel-by-pixel movement of said mouse pointer on said display screen when said special function key is active, said keyboard controller transmitting conventional scan code data in response to activation of said selected keys when said special function key is not active.

11. A mouse pointer emulating apparatus for controlling the position of a mouse pointer on a host computer display screen, said mouse pointer emulating apparatus further providing additional mouse functions in a host computer, said emulating apparatus interpreting selected keys on a keyboard to output data similar to that provided by a peripheral mouse pointer coupled to a conventional mouseport on a computer operable with a conventional mouse pointer, said mouse pointer emulating apparatus further providing incremented speed variation which increases the speed of the mouse pointer on the display screen by predetermined increments as selected ones of the selected keys remains active, said mouse pointer emulating apparatus comprising:

a keyboard controller coupled to the selected keys and to said host computer, one of the selected keys comprising a special function key, said keyboard controller responsive to the special function key, when active, to interpret signals from other ones of said selected keys and generate mouse data packets, wherein said signals provided by said selected keys to said keyboard controller when said special function key is active are identical to signals provided by said selected keys to said keyboard controller when said special function key is not active, said keyboard controller further transmitting said mouse data packets to said host computer at preselected report intervals to cause pixel-by-pixel mouse pointer movement on said display screen when said special function key is active, said mouse pointer movement on said display screen including movement in a diagonal direction upon simultaneous activation of two of said selected keys, said keyboard controller transmitting conventional scan code data in response to activation of said selected keys when said special function key is inactive.

* * * * *